United States Patent [19]
Miller

[11] Patent Number: 6,081,884
[45] Date of Patent: Jun. 27, 2000

[54] EMBEDDING TWO DIFFERENT INSTRUCTION SETS WITHIN A SINGLE LONG INSTRUCTION WORD USING PREDECODE BITS

[75] Inventor: Paul K. Miller, McKinney, Tex.

[73] Assignee: Advanced Micro Devices, Inc., Sunnyvale, Calif.

[21] Appl. No.: 09/002,902

[22] Filed: Jan. 5, 1998

[51] Int. Cl.[7] ..................................................... G06F 9/38
[52] U.S. Cl. .......................... 712/204; 712/24; 712/213; 712/215
[58] Field of Search .............................. 712/24, 204, 214, 712/215, 213

[56] References Cited

U.S. PATENT DOCUMENTS

| | | | |
|---|---|---|---|
| 5,163,139 | 11/1992 | Haigh et al. | 712/206 |
| 5,442,762 | 8/1995 | Kato et al. | 712/208 |
| 5,774,737 | 6/1998 | Nakano | 712/24 |
| 5,852,741 | 12/1998 | Jacobs et al. | 712/24 |
| 5,922,065 | 7/1999 | Hull et al. | 712/24 |
| 5,930,508 | 7/1999 | Faraboschi et al. | 395/706 |

OTHER PUBLICATIONS

Halfhill, "Beyond Pentium II", BYTE Magazine, Dec. 1997, 9 pages.

*Primary Examiner*—Kenneth S. Kim
*Attorney, Agent, or Firm*—Conley, Rose & Tayon, PC; B. Noel Kivlin

[57] ABSTRACT

A microprocessor optimized to execute two instruction sets in a long instruction word (LIW) format. One instruction set may have variable length instructions. The microprocessor has an alignment unit configured to detect variable length instructions as they are fetched from an instruction cache, and then embed the variable length instructions within a long instruction word. The long instruction words are stored in a central window until they are executed by a number of functional units. A number of the microprocessor's functional units may be configured to execute instructions from both instruction sets. These dual instruction set-capable functional units may be used in conjunction with an MROM unit configured to translate a subset of instructions from one instruction set into less complex instructions in either instruction set. The central window may be configured to shift the order of the long instruction words before they are issued in order to minimize the amount of time the functional units are idle. The central window may be replaced altogether by a series of reservation stations. A method for operating a microprocessor with two instruction sets is also disclosed.

20 Claims, 6 Drawing Sheets

EMBEDDING TWO DIFFERENT INSTRUCTION SETS WITHIN A SINGLE LONG INSTRUCTION WORD USING PREDECODE BITS

BACKGROUND OF THE INVENTION

1. Field of the Invention

This invention relates to microprocessors, and more particularly, to embedding variable length instructions within a long instruction word.

2. Description of the Relevant Art

Early microprocessors used instruction sets having variable length instructions. Varying the instruction length allowed for efficient utilization of storage space and memory which were scarce resources at the time. An example of a variable length instruction set is the x86 instruction set. A generic format illustrative of the x86 instruction set is shown in FIG. 1. As illustrated in the figure, an x86 instruction consists of from one to five optional prefix bytes 102, followed by an operation code (opcode) field 104, an optional addressing mode (Mod R/M) byte 106, an optional scale-index-base (SIB) byte 108, an optional displacement field 110, and an optional immediate data field 112.

Opcode field 104 defines the basic operation for a particular instruction. The default operation of a particular opcode may be modified by one or more prefix bytes. For example, a prefix byte may be used to change the address or operand size for an instruction, to override the default segment used in memory addressing, or to instruct the processor to repeat a string operation a number of times. Opcode field 104 follows prefix bytes 102, if any, and may be one or two bytes in length. Addressing mode (Mod R/M) byte 106 specifies the registers used as well as memory addressing modes. Scale-index-base (SIB) byte 108 is used only in 32-bit base-relative addressing using scale and index factors. A base field of the SIB byte specifies which register contains the base value for the address calculation, and an index field specifies which register contains the index value. A scale field specifies the power of two by which the index value will be multiplied before being added, along with any displacement, to the base value. The next instruction field is optional displacement field 110, which may be from one to four bytes in length. Displacement field 110 contains a constant used in address calculations. Immediate field 112 is optional and may also be from one to four bytes in length. It contains a constant used as an instruction operand. The shortest x86 instructions are only one byte long, and comprise a single opcode byte. The 80286 sets a maximum length for an instruction at 10 bytes, while the 80386 and 80486 both allow instruction lengths of up to 15 bytes.

In the mid-1980's as memory and storage became less expensive, reduced instruction set computers (RISC) debuted using fixed instruction lengths. Fixed instruction lengths advantageously reduced the microprocessor resources required to fetch, align and decode an instruction. Consequently, RISC instruction sets allowed for greater performance.

Since the introduction of the RISC architecture, further improved architectures have been proposed. One proposed architecture bundles multiple RISC instructions into groups called long instruction words (LIW). FIG. 2 illustrates one proposed LIW format. LIW 120 comprises one dependency field 122 and three instruction fields 124, 126, and 128. Dependency field 122 identifies which instructions within instruction word 120, if any, are dependent upon other instructions. Each instruction field 124, 126, and 128 is of equal length (in this case 40 bits) and is designed to hold one individual RISC instruction comprising an opcode and number of fields defining register operands. Other proposed architectures eliminate dependency field 122 in favor of a LIW without any dependencies between the instructions whatsoever.

LIW architectures offer many of the advantages of RISC architectures while improving the ability of the microprocessor to execute instructions in parallel. However, the widespread acceptance of the x86 family of microprocessors by consumers and software developers has led microprocessor designers to forego the benefits of RISC and LIW architectures in favor of compatibility with the large amount of software available for the x86 instruction set.

Continuing improvements in process technologies have further magnified the potential advantages of the LIW architecture. As process technologies allow microprocessors to have greater numbers of transistors, the ability to put these transistors to work in parallel becomes more important. LIW architectures provides a parallel structure capable of taking advantage of the large numbers of transistors likely to be in future microprocessors. As a result, microprocessor designers are faced with an increasingly difficult decision of whether to forgo backward compatibility with x86 instructions in pursuit of higher performance.

One proposed solution is to design a RISC or LIW microprocessor and provide backward compatibility by using software or microcode to translate all x86 instructions into RISC or LIW format. Unfortunately, this solution typically yields unsatisfactory performance for x86 software because the translation process greatly slows execution and generates a large amounts of non-optimized code. Therefore, a solution providing both the advantages of a LIW architecture with reasonable performance for variable length instructions is needed.

SUMMARY OF THE INVENTION

The problems outlined above are in large part solved by a microprocessor having an alignment unit in accordance with the present invention. In one embodiment, the alignment unit is configured to detect variable length instructions as they are fetched from the instruction cache and then embed the variable length instructions within a LIW. The LIWs are then stored in a central window until they are executed by a number of functional units. Advantageously, the microprocessor may obtain the benefits of a LIW format while still retaining backward compatibility with variable length instructions.

Furthermore, a number of the microprocessor's functional units may be configured to execute both RISC instructions and variable length instructions. This may improve overall processor performance by preventing the variable-length capable functional units from sitting idle when only RISC instructions are available. The variable length-capable functional units may be used in conjunction with an MROM unit configured to translate a subset of the variable length instructions into RISC or other, simpler variable length instructions.

The central window may be configured to shift the order of the LIWs before they are issued in order to minimize the amount of time the functional units are idle. Furthermore, the central window may be replaced altogether by a series of reservation stations.

In yet another embodiment, the microprocessor may be configured to operate on two different RISC instruction sets (as opposed to one RISC instruction set and one variable-length instruction set). The same mechanism may be used to align instructions from the two RISC instruction sets into a LIW.

A method for operating a microprocessor with two instruction sets is also contemplated. In one embodiment, the method comprises storing instruction bytes from two different instruction sets into a cache and then reading a plurality of instruction bytes from the cache with a fetch address. Instructions within the plurality of instruction bytes are aligned into a long instruction word having two fields, a first field for storing instructions from the first instruction set, and a second field for storing instructions from the second set. Finally, the instructions within the long instruction word are issued to a plurality of functional units.

BRIEF DESCRIPTION OF THE DRAWINGS

Other objects and advantages of the invention will become apparent upon reading the following detailed description and upon reference to the accompanying drawings in which.

Figure 1:
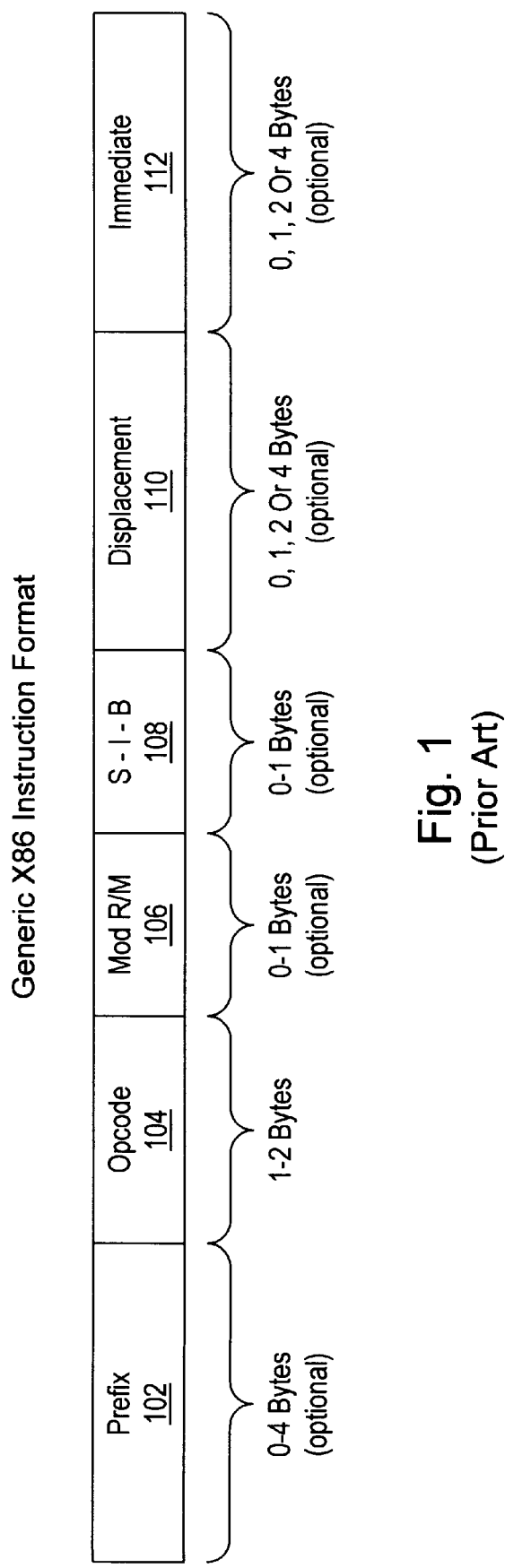
FIG. 1 is a block diagram of a generic x86 instruction format.
Figure 2:
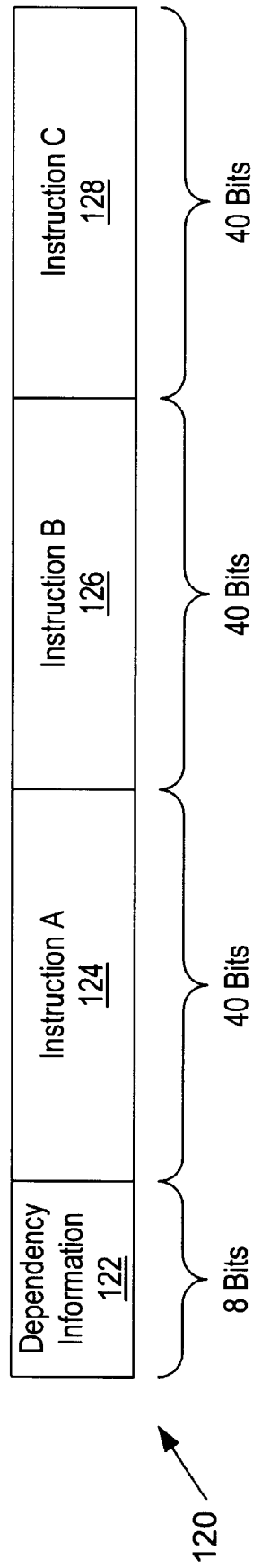
FIG. 2 is a block diagram of a generic LIW instruction format.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 3:
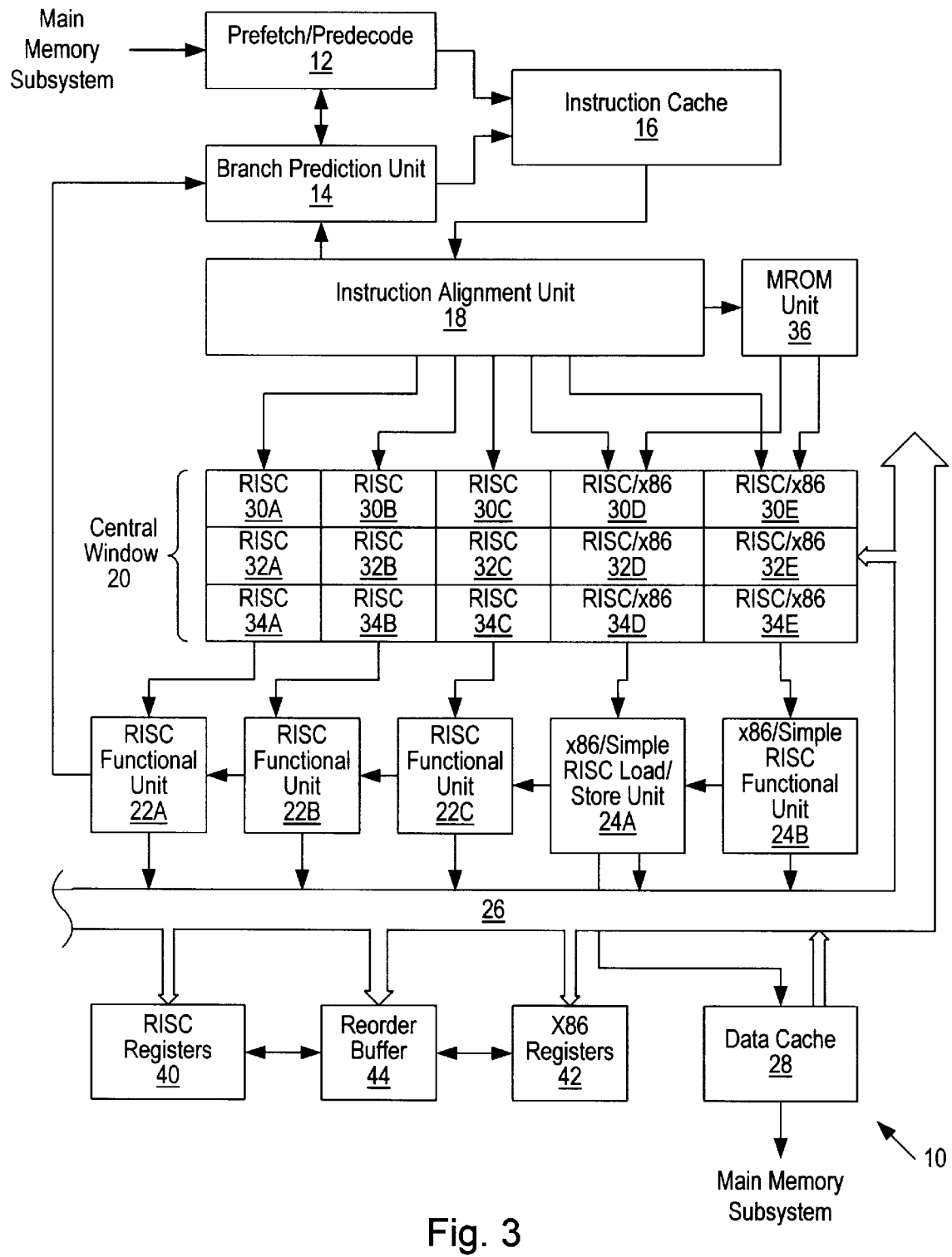
FIG. 3 is a block diagram of one embodiment of a microprocessor configured to execute both RISC and variable length instructions in a LIW format.

Turning now to FIG. 3, a block diagram of one embodiment of a microprocessor 10 is shown. Microprocessor 10 is configured to execute both RISC and variable length instructions within a LIW format. In one embodiment, microprocessor 10 includes the following: a prefetch/predecode unit 12, a branch prediction unit 14, an instruction cache 16, an instruction alignment unit 18, a central window 20, a plurality of RISC functional units 22A–22C, a plurality of x86/RISC functional units 24A–24B, a data cache 28, an MROM unit 36, a RISC register file 40, an x86 register file 42, and a reorder buffer 44.

Note that the x86 instruction set is used merely for exemplary purposes. Microprocessor 10 may be configured to execute other combinations of two instruction sets, for example, two different RISC instruction sets or a RISC instruction set and another variable length instruction set.

In one embodiment, prefetch/predecode unit 12 is coupled to receive instructions from a main memory subsystem (not shown), and is further coupled to instruction cache 16 and branch prediction unit 14. Similarly, branch prediction unit 14 is also coupled to instruction cache 16. Branch prediction unit 14 is further coupled to functional units 22A–22C and 24A–24B. Instruction cache 16 is coupled to instruction alignment unit 18, which is in turn coupled to MROM unit 36 and central window 20. Central window 20 is coupled to RISC functional units 22A–22C and x86/RISC functional units 24A–24B. Functional units 22A–22C and 24A–24B are coupled to result bus 26, which connects RISC register file 40, x86 register file 42, data cache 28 and central window 20. Functional unit 24A, which may be configured to perform load and store operations, is coupled to data cache 28 and result bus 26, while functional unit 24B is coupled to result bus 26.

Instruction cache 16 is a high speed cache memory configured to store both x86 and RISC instructions. Instructions are fetched from instruction cache 16 and dispatched to alignment unit 18. In one embodiment, instruction cache 16 is configured to store up to 64 kilobytes of instructions in a 4-way set associative structure having 32 byte lines (wherein a byte comprises 8 binary bits). Alternatively, other associative configurations may be employed, e.g., 2-way set associativity. It is noted that instruction cache 16 may be implemented as a fully associative, set associative, or direct mapped configuration.

Instruction cache 16 may additionally employ a way prediction scheme in order to speed cache access times. Set associate caches comprises two arrays, a tag array and a data array. Without way prediction, the cache is accessed by using part of the fetch address to access row within the tag array. A series of tags are then read from the tag array and compared with the another part of the fetch address. Whichever tag matches the fetch address determines the way (or column) in the data array in which the desired data is stored, If no tags match, the data is not in the array and a cache "miss" occurs. In one embodiment, instruction cache 16 may be configured to predict the way that is accessed. After the information is accessed, the tag is compared with the fetch address to verify the way prediction. If the way prediction is incorrect, the correct instructions are fetched and the incorrect instructions are discarded. In this manner, the way is selected prior to accessing the instruction storage. Using way prediction, the access time of instruction cache 16 may be similar to a direct-mapped cache.

RISC and x86 instructions are read from main memory and stored into instruction cache 16 by prefetch/predecode unit 12. Instructions may be prefetched, i.e., read from memory before they are actually requested, by using a prefetch scheme. A variety of prefetch schemes may be employed by prefetch/predecode unit 12. As prefetch/predecode unit 12 transfers instructions from main memory to instruction cache 16, prefetch/predecode unit 12 generates a number of predecode bits for each byte of the instructions. An instruction set identification bit, in this case a RISC/x86 bit, is generated to indicate whether the instruction byte is associated with a RISC or x86 instruction. For x86 instructions, a start bit, an end bit, and a functional bit are also generated. These x86 predecode bits form tags indicative of the boundaries of each instruction. The predecode tags may also convey additional information such as whether a given instruction can be decoded directly by alignment unit 18 or whether the instruction is executed by invoking a microcode procedure controlled by MROM unit 36 (described in greater detail below). For RISC instructions, other information may be stored in the predecode bits, e.g., whether the instruction requires dispatch to load/store functional unit 24A. Still further, prefetch/ predecode unit 12 may be configured to detect branch instructions and to store branch prediction information corresponding to the branch instructions into branch prediction unit 14.

Below, one possible encoding of the predecode tags for the x86 instruction set will be described. In the exemplary encoding, if a given byte is the first byte of an instruction, the start bit for that byte is set. If the byte is the last byte of an instruction, the end bit for that byte is set. Instructions which may be directly decoded by alignment unit 18 and executed by functional units 24A and 24B are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

Start bits 10000
End bits 00001
Functional bits 11000

According to one particular embodiment, early identification of an instruction that includes a scale-index-base (SIB) byte is advantageous for MROM unit 36. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are x86 instructions which are determined to be too complex for simple alignment and decoding by instruction alignment unit 18. MROM instructions are decoded by invoking MROM unit 36. More specifically, when an MROM instruction is encountered, MROM unit 36 parses and issues the instruction into a subset of defined fast path instructions to effectuate the desired operation. MROM unit 36 dispatches the subset of fast path instructions to decode units 20. In one embodiment, the fast path instructions are RISC instructions. In another embodiment, the fast path instructions are simple x86 instructions.

While some x86 instructions are complex enough to require microcode routines, having functional units capable of performing simple x86 instructions without microcode may speed execution of x86 code. Furthermore, having x86-capable functional units may reduce the amount of microcode needed for complex instructions, i.e., it may only require two microcode instructions to execute a complex x86 instruction on an x86 functional unit while it may take more microcode instructions to execute on a complex x86 instruction on a RISC functional unit. The added flexibility of having both x86 and RISC functional units may further allow MROM unit 36 select the optimum instruction set in which to translate the complex x86 instruction, i.e., RISC for some instructions and x86 for others.

When either RISC or x86 instructions are fetched, the instruction bytes are conveyed from instruction cache 16 to instruction alignment unit 18. As the instructions are fetched, instruction cache 16 scans the corresponding predecode data to provide information to instruction alignment unit 18 regarding the instructions being fetched. Instruction alignment unit 18 uses the scanning data to align instructions into a LIW format. Once the instructions are aligned, the LIW is conveyed to central window 20.

Central window 20 is configured to store a plurality of LIWs. Central window 20 may store a LIW until each instruction within the LIW is ready for issue, at which time the LIW is issued to functional units 22A–22C and 24A–24B. An instruction is ready for issue when all of its operands have been received and the instruction is no longer dependent upon the completion of another instruction. LIWs remain in central window 20 until all dependencies have been resolved and all operands have been received. Each clock cycle, central window 20 conveys the oldest LIW (in program order) that is ready for issue to functional units 22A–22C and 24A–24B.

As functional units 22A–22C and 24A–24B complete execution of the instructions within the LIW, the results are output upon result bus 26 From result bus 26 the results can be read by RISC register file 40, x86 register file 42, reorder buffer 44, and central window 20. Central window 20 is also configured to store the results if they are needed as an operand for any stored instructions. Register files 40 and 42 may employ future files (not shown) to store speculatively generated future register values before the instructions are retired. Once an instruction is retired, the results are no longer speculative and therefore may be stored to the appropriate register file. Having two register files may advantageously allow backward compatibility with the x86 instruction set while allow the RISC instruction set to have its own register file.

Before proceeding with a more detailed description of instruction alignment unit 18, central window 20, and functional units 22A–22C and 24A–24B, general aspects regarding other subsystems that may be employed within the exemplary microprocessor 10 of FIG. 3 will be described.

Branch Prediction

Microprocessor 10 may employ branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Alignment unit 18 and functional units 22A–22C and 24A–24B provide update information to branch prediction unit 14. Because branch prediction unit 14 stores two targets per 16 byte portion of the cache line, some branch instructions within the line may not be stored in branch prediction unit 14. Alignment unit 18 may be configured to detect branch instructions which were not predicted by branch prediction unit 14. Functional units 22A–22C and 24A–24B execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Out of Order Execution

In one embodiment, microprocessor 10 also supports out of order execution, and thus employs reorder buffer 44 to keep track of the original program sequence for register read and write operations, to implement register renaming, to allow for speculative instruction execution and branch misprediction recovery, and to facilitate precise exceptions. A temporary storage location within reorder buffer 44 is reserved upon decode of an instruction that involves the update of a register to thereby store speculative register states. If a branch prediction is incorrect, the results of speculatively-executed instructions along the mispredicted path can be invalidated in the buffer before they are written to register files 40 and 42. Similarly, if a particular instruction causes an exception, instructions subsequent to the particular instruction may be discarded. In this manner, exceptions are "precise" (i.e., instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 44.

Upon decode of a particular instruction, if a required operand is a register location, microprocessor 10 is configured to route register address information to reorder buffer 44 and register files 40 and 42 simultaneously. The x86 register file includes eight 32 bit real registers (i.e., typically referred to as EAX, EBX, ECX, EDX, EBP, ESI, EDI and ESP), while RISC register file 40 includes a larger number of registers. Note that while register files 40 and 42 are shown separately, they may be configured to intersect or share registers. In embodiments of microprocessor 10 which employ the x86 microprocessor architecture, register file 40 comprises storage locations for each of the 32 bit real registers. Additional storage locations may be included within register file 40 for use by MROM unit 36. Reorder buffer 44 contains temporary storage locations for results which change the contents of these registers to thereby allow out of order execution. A temporary storage location of reorder buffer 44 is reserved for each instruction which, upon decode, is determined to modify the contents of one of the real registers. Therefore, at various points during execution of a particular program, reorder buffer 44 may have one or more locations which contain the speculatively executed contents of a given register. If following decode of a given instruction it is determined that reorder buffer 44 has a previous location or locations assigned to a register used as an operand in the given instruction, reorder buffer 44 forwards to central window 20 either: 1) the value in the most recently assigned location, or 2) a tag for the most recently assigned location if the value has not yet been produced by the functional unit that will eventually execute the previous instruction. If reorder buffer 44 has a location reserved for a given register, the operand value (or reorder buffer tag) is provided from reorder buffer 44 rather than from register files 40 and 42. If there is no location reserved for a required register in reorder buffer 44, the value is taken directly from register file 40 and 42 (or a corresponding future file). If the operand corresponds to a memory location, the operand value is provided to central window 20 through the load/store functional unit 24A.

Line-Oriented Reorder Buffer

In one particular embodiment, reorder buffer 44 is configured to store and manipulate concurrently decoded instructions as a unit. This configuration will be referred to herein as "line-oriented". By manipulating several instructions together, the hardware employed within reorder buffer 44 may be simplified. For example, a line-oriented reorder buffer may allocates storage sufficient for instruction information pertaining to all five instructions in a LIW whenever a LIW dispatched by alignment unit 18. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register files 40 and 42 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register files 40 and 42 and freeing the corresponding storage is referred to as "retiring" the instructions. It is further noted that any reorder buffer configuration may be employed in various embodiments of microprocessor 10.

Linearly Addressed Data Cache

Data cache 28 is a high speed cache memory provided to temporarily store data being transferred between load/store functional unit 24A and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 may be linearly addressed. A linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Instruction Alignment Unit

Figure 4:
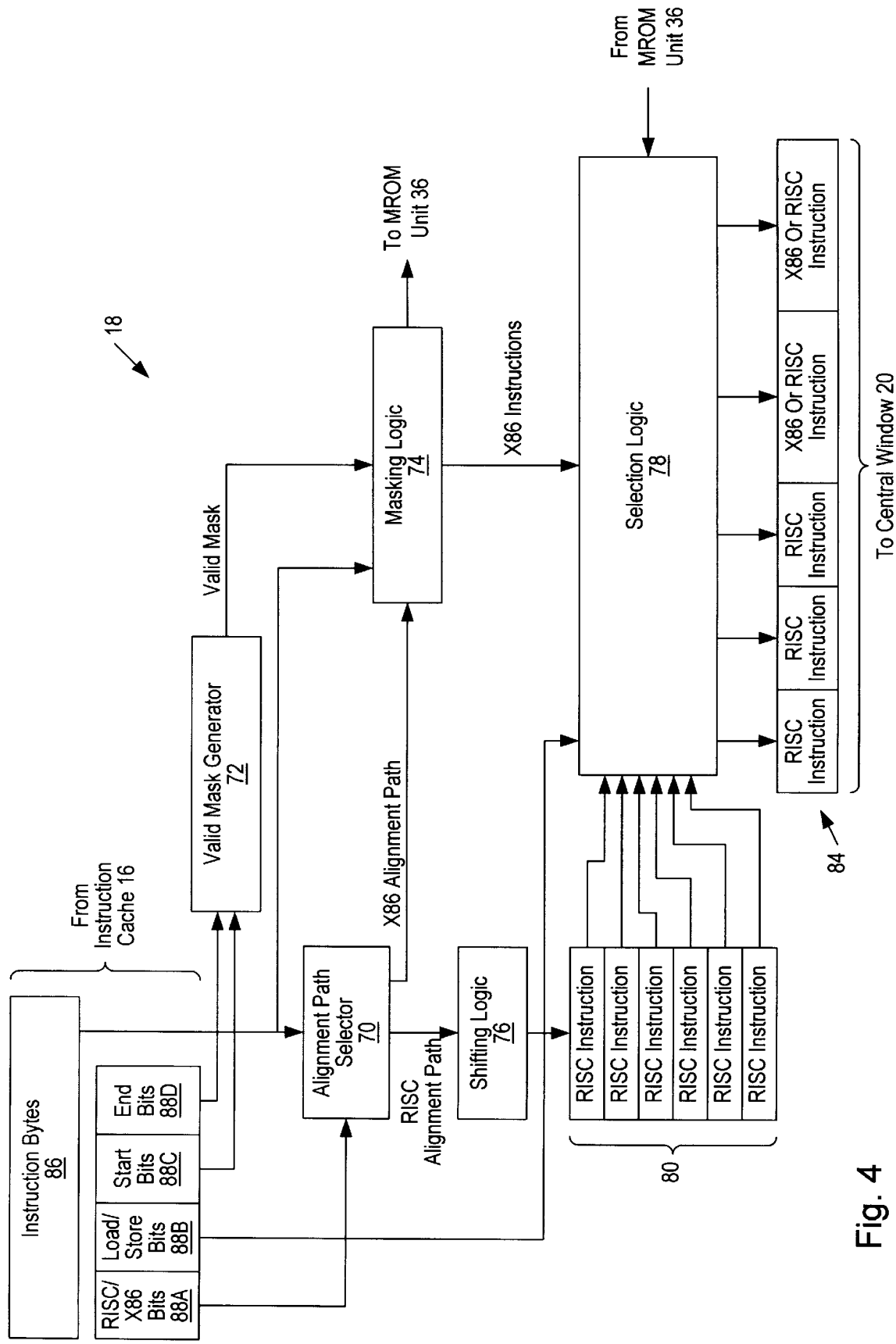
FIG. 4 is a block diagram of showing more detail of one embodiment of the instruction alignment unit from FIG. 3.

Turning now to FIG. 4, more detail of one embodiment of instruction alignment unit 18 is shown. Instruction alignment unit 18 comprises alignment path selector 70, valid mask generator 72, masking logic 74, shifting logic 76, selection logic 78, and RISC instruction buffer 80. Alignment path selector 70 is coupled to shifting logic 76 and masking logic 74. Shifting logic 76 is coupled to RISC instruction buffer 80, which is in turn is coupled to selection logic 78. Valid mask generator 72 and selection logic 78 are also coupled to masking logic 74.

When an instruction is fetched from instruction cache 16, instruction bytes 86 and corresponding predecode bits 88A–88D are conveyed to instruction alignment unit 18. Alignment path selector 70 receives instruction bytes 86 and routes them according to RISC/x86 predecode bit 88A. If an instruction byte is part of an x86 instruction, alignment path selector 70 routes the instruction byte to masking logic 74. If an instruction byte is part of a RISC instruction, alignment path selector 70 routes it to shifting logic 76. Shifting logic 76 receives the RISC instruction bytes, shifts the individual bytes to form complete RISC instructions, and then stores the instructions within RISC instruction buffer 80. As RISC instructions have a fixed length, shifting logic 76 may be set to shift a fixed number of instruction bytes into each storage location within RISC instruction buffer 80.

In parallel with alignment path selection and RISC instruction shifting, valid mask generator 72 receives the start and end bits corresponding to x86 instruction bytes fetched from instruction cache 16. Valid mask generator 72 then generates a valid mask for each x86 instruction. A valid mask is a series of bits wherein each bit corresponds to one byte of an instruction. For a particular instruction fetch, the valid mask bits associated with the first byte of the instruction, the last byte of the instruction, and all bytes in between the first and last bytes of the instruction are asserted. All other bits in the valid mask are not asserted. For example, given the following 8-byte instruction cache line, the valid mask for a fetch of instruction B would appear as follows:

|                     | byte | 01234567   |
|---------------------|------|------------|
| cache line          |      | AABBBBCC...|
|                     | bit  | 01234567   |
| end bit information |      | 01000100   |
| start pointer       |      | 00100000   |
| valid mask          |      | 00111100   |

Once a valid mask is calculated for a particular instruction fetch, it may then be used to mask off the unwanted bytes that are not part of the particular instruction. In the example above, the valid mask for the fetch of instruction B could be used to mask off the unwanted end bytes of instruction A and the unwanted beginning bytes of instruction C.

Masking logic 74 receives the valid masks calculated by valid mask generator 72 and uses them mask each x86 instruction received from alignment path selector 70. Masking logic also performs partial decoding on each x86 instruction. Each instruction's operands are identified and conveyed to selection logic for dependency checking (see below). Each x86 instruction may also be expanded and aligned so that each instruction's opcode is in the same location to provide for more convenient execution. In addition, if masking logic 74 detects an x86 instruction that is too complex to for single issue, masking logic 74 signals MROM unit 36 to substitute a sequence of simpler microcode instructions. For example, MROM unit 36 may issue two, simplified instructions in lieu of the complex instruction.

Selection logic 78 is configured to receive the masked and partially decoded x86 instructions from masking logic 74, microcode instructions from MROM unit 36, and selected predecode bits from instruction cache 16, e.g., load/store indicator bit 88B. Selection logic 78 is configured to select instructions from RISC instruction buffer 80. Instructions are selected based upon program order and operand dependencies between the instructions. Selection logic 78 creates LIW 84 by selecting instructions that may be performed in parallel, e.g., without functional unit or hardware dependencies. In the embodiment illustrated in FIG. 4, selection logic may select up to three RISC instructions and two x86 instructions in a clock cycle. If there are no x86 or microcode instructions available, selection logic 78 may select up to five RISC instructions from instruction buffer 80 As RISC instructions may be shorter than x86 instructions, the remaining bytes of each x86/RISC field in LIW 84 may be padded with zeros or ones. If selection logic 78 is unable to fill LIW 84 with instructions that do not depend upon each other, selection logic 78 may fill the remaining instruction fields within LIW 84 with NO-Ops (non-operations). Once all the fields in LIW 84 are filled with instructions or NO-Ops, LIW 84 is conveyed to central window 20.

In one embodiment, the fields within LIW 84 each correspond to a particular functional unit, i.e., each field has a dedicated issue position. Selection logic 78 may then be configured to select RISC and x86 memory instructions, i.e., loads and stores, and route them to a particular fixed position within LIW 84, e.g., the first x86/RISC position as illustrated in FIG. 4. Advantageously, this allows microprocessor 10 to have one combined load/store unit for executing both RISC and x86 load and store instructions.

Central Window

Figure 5:
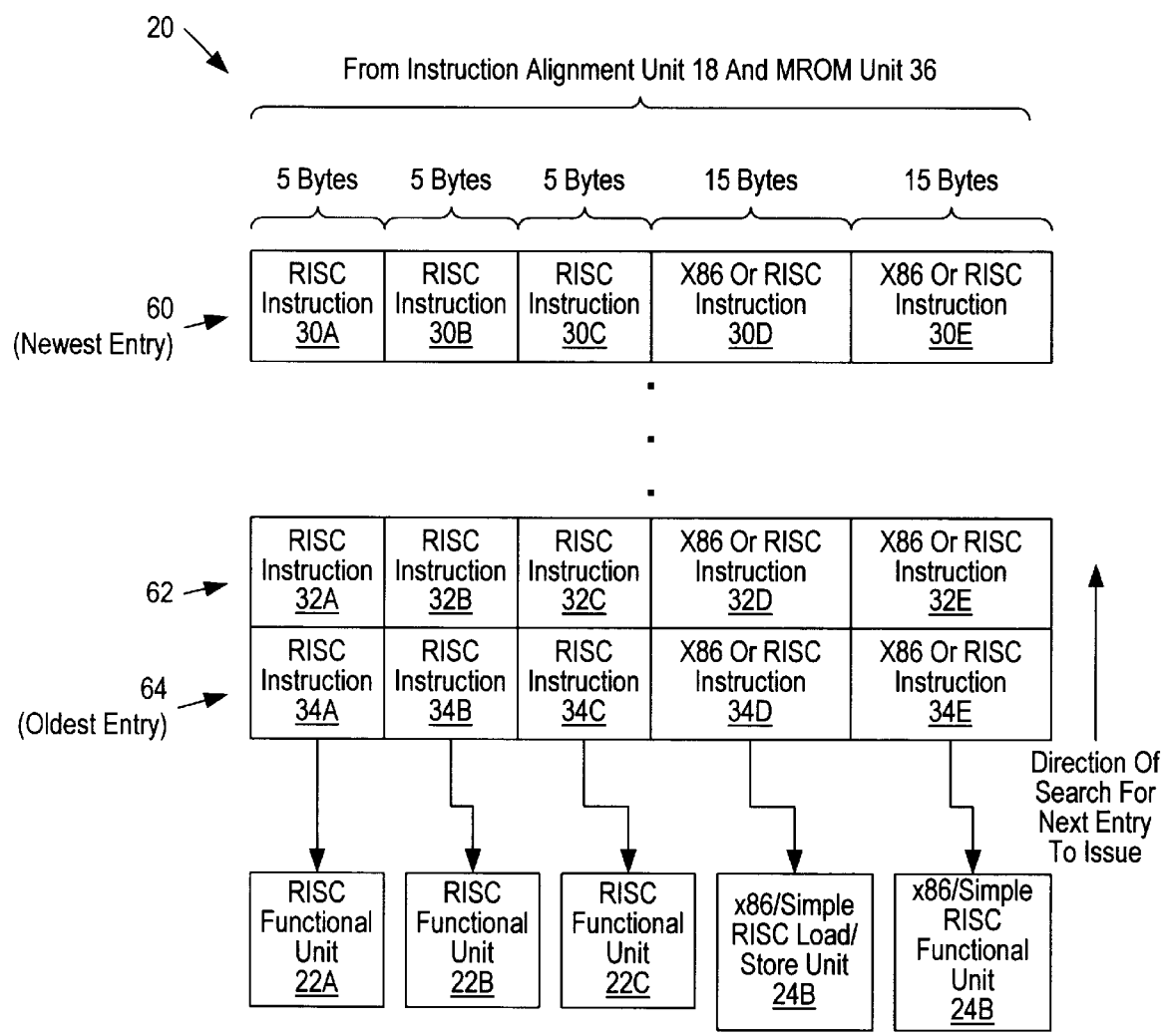
FIG. 5 is a block diagram of showing more detail of one embodiment of the central window from FIG. 3.
Figure 6:
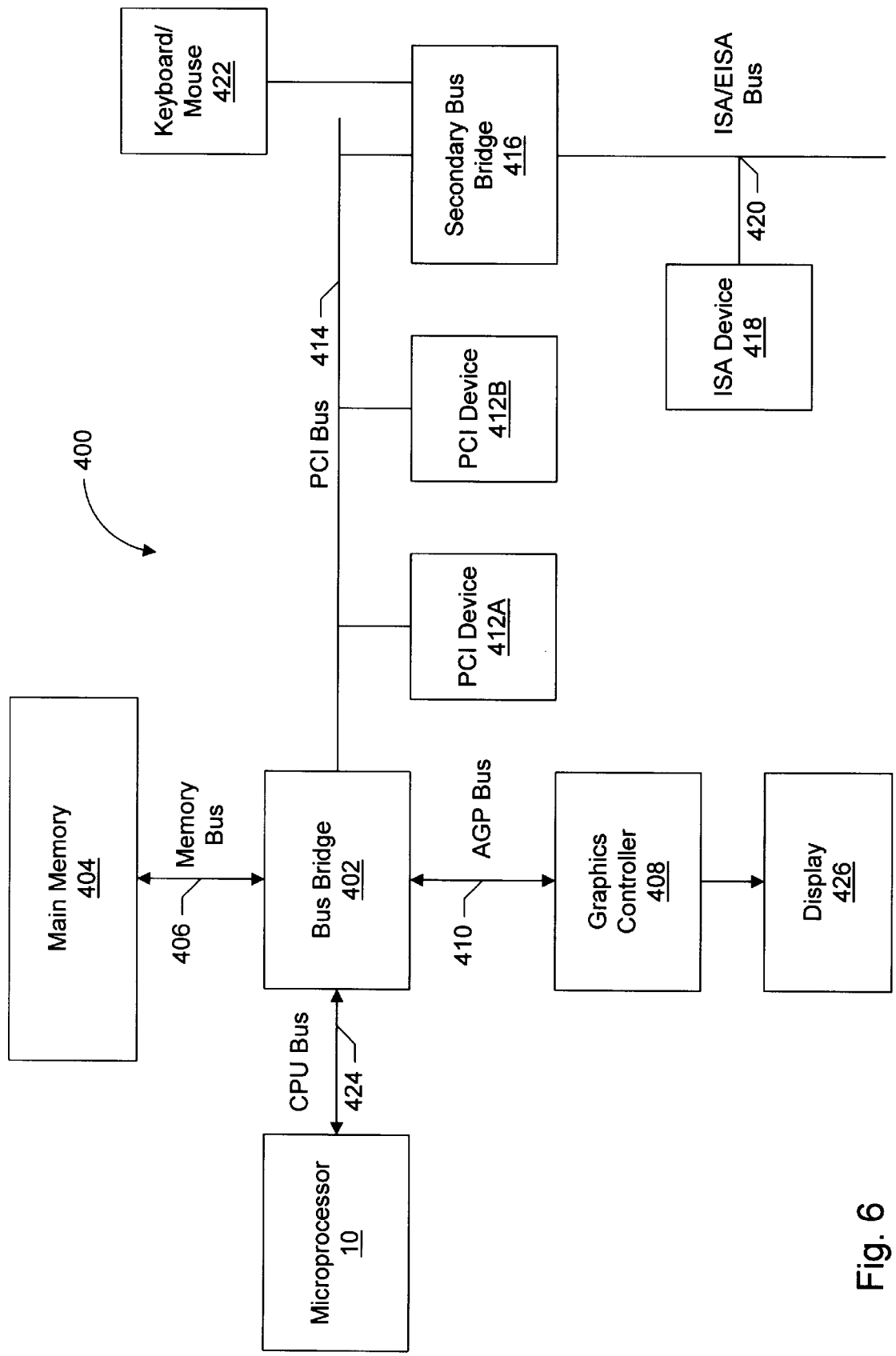
FIG. 6 is a diagram showing one embodiment of a computer system configured to utilize the microprocessor of FIG. 3.

Turning now to FIG. 5, a detailed diagram of one embodiment of central window 20 is shown. Central window receives instructions from alignment unit 18 and MROM unit 36. Central window 20 is configured to store the instructions in a plurality of entries similar to LIW entry 60. LIW entry 60 comprises the following five fields: three RISC instruction fields 30A–30C and two x86/RISC instruction fields 30D–30E. In one embodiment, RISC instruction fields 30A–30C each store five instruction bytes, while x86/RISC instruction fields 30D–30E store 15 instruction bytes (i.e., the maximum length for x86 instructions). Instruction fields 30D-30E are configured to store either x86 instructions or RISC instructions. As previously noted, unused bytes within fields 30D–30E may be padded with ones or zeros. Each instruction entry shown may have a number of corresponding storage fields (not shown), including a source operand field, a destination operand field, a reorder buffer tag field, and a status field. Central window 20 holds all instructions and corresponding fields until they are ready to be issued to functional units 22A–22C and 24A–24B. As previously noted, each instruction 30A–30E in LIW entry 60 is configured to be issued during the same clock cycle.

In one embodiment, central window 20 is configured to receive one LIW entry from instruction alignment unit 18 per clock cycle. Central window 20 may also be configured to issue one LIW entry to functional units 22A–22C and 24A–24B per clock cycle. Once an entry is issued, its storage locations within central window 20 are deallocated and thus become available for other instructions. In one embodiment, central window 20 may be configured to shift and collapse deallocated entries in a FIFO-like manner. For example, if the oldest instruction (stored in location 64) is not available for issue because it is waiting upon the result of a previous instruction, and the second oldest instruction (stored in location 62) is available for issue, central window 20 may issue the second oldest instruction. The remaining LIW entries in central window 20 may then be shifted or collapsed to fill in vacated location 62 so that the entry 60 will be vacant and ready to be filled when the next clock cycle occurs. Advantageously, this configuration allows instructions to be executed out of order, thereby possibly preventing functional units 22A–22C and 24A–24B from sitting idle while waiting for the next LIW entry to become ready for issue. As the instruction results are saved to reorder buffer 44 (and possibly future files associated with register files 40 and 42) before actually updating the current state of the microprocessor, reorder buffer 44 is able to retire the instructions in order even though they were executed out of order.

Central window 20 may also be configured to receive branch misprediction signals from branch prediction unit 14. In the event of a misprediction, central window 20 may invalidate or flush all instructions occurring after the mispredicted instruction (in program order). In another embodiment of microprocessor 10, central window 20 may be replaced with a plurality of reservation stations, wherein each reservation station corresponds to one particular functional unit. The reservation stations may undertake a similar instruction reordering in an attempt to prevent the functional units from becoming idle. Advantageously, both embodiments, i.e., with a central window and with reservation stations, allow x86 instructions to execute in parallel with RISC instructions. This may be particularly advantageous when x86 code is running in an emulation or backward-compatibility window within an operating system written in RISC or LIW format. Thus system calls could be executed in the optimized RISC or LIW format by functional units 22A–22C while the remaining x86 code would be efficiently executed on functional units 24A and 24B. Furthermore, the RISC and x86 instructions are less likely to have operand dependencies because they each have their own set of registers.

Functional Units

Once a LIW is issued from central window 20, each instruction field within the LIW is routed to a functional unit. The exemplary embodiment of FIG. 5 uses five functional units, i.e., three RISC-only functional units 22A–22C and two combined RISC/x86 functional units 24A–24B. However, other configurations are also contemplated. For example, functional units 24A–24B may be configured to execute only a particular subset of RISC instructions, or none at all. Microprocessor 10 may also have separate floating point units to handle RISC and/or x86 floating point instructions.

As previously noted, in one embodiment of microprocessor 10 functional unit 24A may serve as a combined load/store unit for both RISC and x86 instructions.

Combined load/store functional unit 24A may provide an interface between the other functional units and data cache 28. In one embodiment, load/store unit 24A is configured with a load/store buffer having a plurality of storage locations for storing data and address information for pending loads and stores. When the buffer is full, new memory accesses may have to wait until load/store unit 24A has completed some pending memory access in order to make room for the new accesses. Load/store unit 24A may also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 24A may include a special storage location for storing special registers such as the segment registers and other registers related to address translation as defined by the x86 microprocessor architecture.

In one embodiment, load/store unit 24A may be configured to perform load memory operations speculatively. Store memory operations are performed in program order, but may be speculatively copied into data cache 28. Speculatively copied stores may be placed into a store buffer with a copy of the cache line prior to the update. If the speculatively executed store is later discarded due to a branch misprediction or exception, the cache line may be restored to its original value using the information stored in the buffer. It is noted that load/store unit 24A may be configured to perform any amount of speculative execution, including no speculative execution.

In one embodiment, functional units 24A and 24B may be optimized to perform a subset of all x86 instructions, wherein MROM unit 36 is configured to translate complex x86 instructions into microcode sequences of simpler x86 instructions. Functional units 24A and 24B may also be configured to perform either the entire RISC instruction set or merely a subset thereof In the latter case, selection logic 78 may be configure to route RISC instructions accordingly. Allowing functional units 24A–24B to execute at least some RISC instructions may advantageously prevent functional units 24A–24B from sitting idle when there are no x86 instructions to be executed.

In one embodiment, each of functional units 22A–22C and 24A–24C may be configured to perform common tasks, e.g., shifts, rotates, logical operations, and branch operations, while each individual functional unit may be further optimized to perform a select number of additional functions. For example, functional unit 22A may be configured to perform integer arithmetic operations in addition to the common tasks.

As previously noted, a dedicated floating point unit (not shown) may be employed to accommodate floating point operations. The floating point unit may be operated as a coprocessor, receiving instructions from MROM unit 34 for x86 instructions and subsequently communicating with reorder buffer 32 to complete the instructions. Additionally, functional units 22A–22C may be configured to perform address generation for load and store memory operations performed by load/store functional unit 24A.

Each of functional unit 22A–22C and 24A–24B also provides information regarding the execution of conditional branch instructions to the branch prediction unit 14. As previously noted, if a branch prediction was incorrect, branch prediction unit 14 may cause central window 20 to flush instructions subsequent to the mispredicted branch that have entered the instruction processing pipeline. Branch prediction unit 14 may also cause a fetch of the required instructions from instruction cache 16 or main memory. It is noted that in such situations, results of instructions in the original program sequence which occur after the mispredicted branch instruction are discarded, including those which were speculatively executed and temporarily stored in load/store functional unit 24A, reorder buffer 44, and any future files associated with register files 40 and 42.

Results produced by functional unit 22A–22C and 24A–24B are sent to reorder buffer 44 if a register value is being updated, and to load/store functional unit 24A if the contents of a memory location are changed. If a result is to be stored in a register, reorder buffer 44 stores the result in a location that was reserved for the value of the register when the instruction was initially aligned and decoded. Result bus 26 forwards results from functional units 22A–C and 24A–B to central window 20 and reorder buffer 44. Result bus 26 may be configured to convey not only the result generated, but also the reorder buffer tag identifying the executed instruction.

Embodiment of a Computer System Using Two Instruction Sets

Turning now to FIG. 12, a block diagram of one embodiment of a computer system 400 using microprocessor 10 is shown. In this embodiment, microprocessor 10 is coupled to a variety of system components through a bus bridge 402. Other embodiments are possible and contemplated. In the depicted system, a main memory 404 is coupled to bus bridge 402 through a memory bus 406, and a graphics controller 408 is coupled to bus bridge 402 through an AGP bus 410. Finally, a plurality of PCI devices 412A–412B are coupled to bus bridge 402 through a PCI bus 414. A secondary bus bridge 416 may further be provided to accommodate an electrical interface to one or more EISA or ISA devices 418 through an EISA/ISA bus 420. Microprocessor 10 is coupled to bus bridge 402 through a CPU bus 424.

Bus bridge 402 provides an interface between microprocessor 10, main memory 404, graphics controller 408, and devices attached to PCI bus 414. When an operation is received from one of the devices connected to bus bridge 402, bus bridge 402 identifies the target of the operation (e.g. a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may further incorporate additional functionality, as desired. For example, in one embodiment, secondary bus bridge 416 includes a master PCI arbiter (not shown) for arbitrating ownership of PCI bus 414. An input/output controller (not shown), either external from or integrated with secondary bus bridge 416, may also be included within computer system 400 to provide operational support for a keyboard and mouse 422 and for various serial and parallel ports, as desired. An external cache unit (not shown) may further be coupled to CPU bus 424 between microprocessor 10 and bus bridge 402 in other embodiments. Alternatively, the external cache may be coupled to bus bridge 402 and cache control logic for the external cache may be integrated into bus bridge 402.

Main memory 404 is a memory in which application programs are stored and from which microprocessor 10 primarily executes. A suitable main memory 404 comprises DRAM (Dynamic Random Access Memory), and preferably a plurality of banks of SDRAM (Synchronous DRAM).

PCI devices 412A–412B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures which can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc. It is noted that, while the AGP, PCI, and ISA or EISA buses have been used as examples in the above description, any bus architectures may be substituted as desired.

It is still further noted that the present discussion may refer to the assertion of various signals. As used herein, a signal is "asserted" if it conveys a value indicative of a particular condition. Conversely, a signal is "deasserted" or "not asserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

A microprocessor configured to execute instructions from two different instruction sets has been disclosed. Numerous variations and modifications will become apparent to those skilled in the art once the above disclosure is fully appreciated. It is intended that the following claims be interpreted to embrace all such variations and modifications.

What is claimed is:

1. A microprocessor configured to execute instructions from more than one instruction set comprising:

a predecode unit configured to receive a plurality of instructions comprising instructions from a first instruction set and a second instruction set, wherein said first instruction set and said second instruction set each have different instruction formats that differ at least in length, wherein said predecode unit is configured to generate one or more predecode bits corresponding to each of said instruction bytes, wherein said predecode bits are at least indicative of whether the corresponding instruction bytes are from said first instruction set or said second instruction set;

a cache configured to store said instruction bytes and said predecode bits; and an instruction unit alignment unit coupled to said cache and configured to receive said instruction bytes and said predecode bits from said cache, wherein said alignment unit is configured to align instructions within said plurality of instruction bytes into a long instruction word, wherein said long instruction word comprises a first field and a second field, wherein said first field comprises a number of instruction locations configured to store instructions from said first instruction set, wherein said second comprises a number of instruction locations configured to store instructions from said second instruction set.

2. The microprocessor as recited in claim 1 wherein said predecode bits are generated by said predecode unit based at least in part on information received by said predecode unit from the microprocessor, wherein said information includes predicted branch addresses.

3. The microprocessor as recited in claim 1 further comprising:

a central window coupled to said instruction alignment unit, wherein said central window is configured to receive said long instruction word from said instruction alignment unit, and a plurality of functional units coupled to said central window, wherein said central window is configured to store said long instruction word at least until all instructions within said long instruction word are ready to be issued to said plurality of functional units.

4. The microprocessor as recited in claim 3 wherein a first group of said plurality of functional units are configured to execute instructions from said first instructions set, and wherein a second group of said functional units are configured to execute instructions from said second instruction set.

5. The microprocessor as recited in claim 4 wherein said second group of functional units is also configured to execute a subset of instructions from said first instruction set.

6. The microprocessor as recited in claim 4, wherein said alignment unit is configured to align a subset of instructions from said first instruction set into said second field within said long instruction word if instructions from said second instruction set are unavailable at the time of alignment.

7. The microprocessor as recited in claim 4 wherein said second group of functional units is also configured to execute instructions from said first instruction set.

8. The microprocessor as recited in claim 4 wherein functional units in said first group are optimized to perform different instructions.

9. The microprocessor as recited in claim 4, wherein each functional unit in said first group is configured to receive instructions from a fixed position within said long instruction word.

10. The microprocessor as recited in claim 1, further comprising a load/store unit, wherein said load/store unit is configured to execute load and store instructions from both said first instruction set and said second instruction set.

11. The microprocessor as recited in claim 1, further comprising:

a first register file configured to be accessed by said first instruction set, and a second register file configured to be accessed by said second instruction set.

12. The microprocessor as recited in claim 11, wherein said first register file and said second register file intersect.

13. The microprocessor as recited in claim 3, wherein said central window is configured to store a plurality of long instruction words, and wherein said central window is configured to reorder the instructions within said plurality of long instruction words.

14. The microprocessor as recited in claim 1 further comprising:

a plurality of reservations stations coupled to said alignment unit, and a plurality of functional units, wherein each functional unit is coupled to one of said plurality of reservation stations, wherein a first group of said functional units are configured to execute instructions from said first instructions set, and wherein a second group of said functional units are configured to execute instructions from said second instruction set.

15. The microprocessor as recited in claim 1, wherein said first instruction set is a variable length instruction set, and wherein said second instruction set is a fixed-length RISC instruction set.

16. The microprocessor as recited in claim 1, wherein said first instruction set uses a long instruction word format having fixed length instructions, and wherein said second instruction set is a variable length instruction set.

17. The microprocessor as recited in claim 1, wherein said first instruction set is a first fixed-length RISC instruction set, and wherein said second instruction set is a second fixed-length RISC instruction set different from said first fixed-length RISC instruction set.

18. A method for operating a microprocessor using two different instruction sets comprising:

reading a plurality of instruction bytes from a memory, wherein said plurality of instruction bytes comprise instructions from a first instruction set and a second instruction set, wherein said first instruction set and said second instruction set have different instruction length formats, and wherein said predecode bits are at least indicative of whether said instruction bytes belong to instructions from said first instruction set or said second instruction set;

generating one or more predecode bits for each of said instruction bytes;

storing said instruction bytes and predecode bits into a cache;

reading a plurality of said instruction bytes and predecode bits from said cache with a fetch address;

aligning instructions within said plurality of instruction bytes into a long instruction word, wherein said long instruction word comprises two fields, a first field for storing instructions from said first instruction set, and a second instruction field for storing instructions from said second instruction set; and issuing said long instruction word to a plurality of functional units.

19. The method as recited in claim 18, wherein said aligning further comprises aligning instructions from said first instruction set into said second instruction field if no instructions from said second instruction set are available.

20. The method as recited in claim 19 wherein said issuing comprises issuing instructions within said first instruction field to a first subset of said plurality of functional units and issuing instructions within said second instruction field to a second subset of said plurality of functional units.

* * * * *